(12) United States Patent
Tan et al.

(10) Patent No.: US 7,302,174 B2
(45) Date of Patent: Nov. 27, 2007

(54) METHOD AND APPARATUS FOR CAPTURING IMAGES USING A COLOR LASER PROJECTION DISPLAY

(75) Inventors: Chinh Tan, Setauket, NY (US); Paul Dvorkis, East Setauket, NY (US); Ron Goldman, Cold Spring Harbor, NY (US); Narayan Nambudiri, Kings Park, NY (US); Carl Wittenberg, Water Mill, NY (US); Miklos Stern, Woodmere, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 232 days.

(21) Appl. No.: 10/858,510

(22) Filed: May 31, 2004

(65) Prior Publication Data

US 2006/0153558 A1    Jul. 13, 2006

Related U.S. Application Data

(60) Provisional application No. 60/534,005, filed on Dec. 31, 2003.

(51) Int. Cl.
*G03B 15/02* (2006.01)
*G03B 29/00* (2006.01)

(52) U.S. Cl. .................. 396/155; 396/429; 348/370
(58) Field of Classification Search ............... 396/155, 396/429, 430; 348/370, 195, 759; 359/202
See application file for complete search history.

(56) References Cited

U.S. PATENT DOCUMENTS

| | | | | |
|---|---|---|---|---|
| 4,318,582 A | * | 3/1982 | Minoura et al. | 359/202 |
| 5,032,924 A | * | 7/1991 | Brown et al. | 348/759 |
| 5,177,556 A | * | 1/1993 | Rioux | 356/73 |
| 5,708,498 A | | 1/1998 | Rioux et al. | |
| 6,245,590 B1 | * | 6/2001 | Wine et al. | 438/52 |
| 6,483,595 B1 | | 11/2002 | Yakovlev et al. | |
| 6,575,581 B2 | * | 6/2003 | Tsurushima | 353/121 |
| 2002/0100884 A1 | | 8/2002 | Maddock | |

* cited by examiner

*Primary Examiner*—W. B. Perkey
*Assistant Examiner*—Rishi S. Suthar
(74) *Attorney, Agent, or Firm*—Kirschstein, et al.

(57) ABSTRACT

A method and apparatus are provided to capture images using a laser projection display (LPD). In a full color LPD camera, three lasers (red, blue, and green) are deployed to scan an image and receive reflected laser light therefrom. The reflected laser light may be analyzed and assembled into a picture. The LPD may also be used to display the picture, to operate as a viewfinder, to print the picture, to operate as a range finder, and the like.

10 Claims, 14 Drawing Sheets

METHOD AND APPARATUS FOR CAPTURING IMAGES USING A COLOR LASER PROJECTION DISPLAY

CROSS REFERENCE TO RELATED APPLICATION

This application claims the priority benefit of U.S. Provisional Application Ser. No. 60/534,005, filed Dec. 31, 2003.

BACKGROUND OF THE INVENTION

1. Field of the Invention

This invention relates generally to electronic displays, and, more particularly, to a laser projection display and its use as an image capture device.

2. Description of the Related Art

Electronic cameras have historically suffered from a number of shortcomings, including high cost, lack of durability, size, weight, limited flexibility and the like. Further, conventional cameras have typically relied upon a flash unit to provide adequate illumination. These flash units are typically heavy consumers of battery power, which tends to shorten the battery life of the camera and render it less useful. Moreover, it is often necessary for a photographer to wait for the battery to charge the flash unit before taking each picture. Further, the use of a flash unit produces numerous undesirable side effects, including reflections that distort and mar the photograph.

Additionally, electronic cameras typically employ one or more display screens for viewing the pictures, or as a viewfinder. These screens add to the overall cost of the camera, are often difficult to view in direct sunlight and are prone to damage and failure.

The present invention is directed to overcoming, or at least reducing, the effects of one or more of the problems set forth above.

SUMMARY OF THE INVENTION

In one aspect of the instant invention, a method for capturing an image is provided. The method comprises scanning laser light over an object; periodically receiving reflected laser light from the object; and arranging the reflected laser light into an image.

BRIEF DESCRIPTION OF THE DRAWINGS

The invention may be understood by reference to the following description taken in conjunction with the accompanying drawings, in which like reference numerals identify like elements, and in which.

Figure 1:
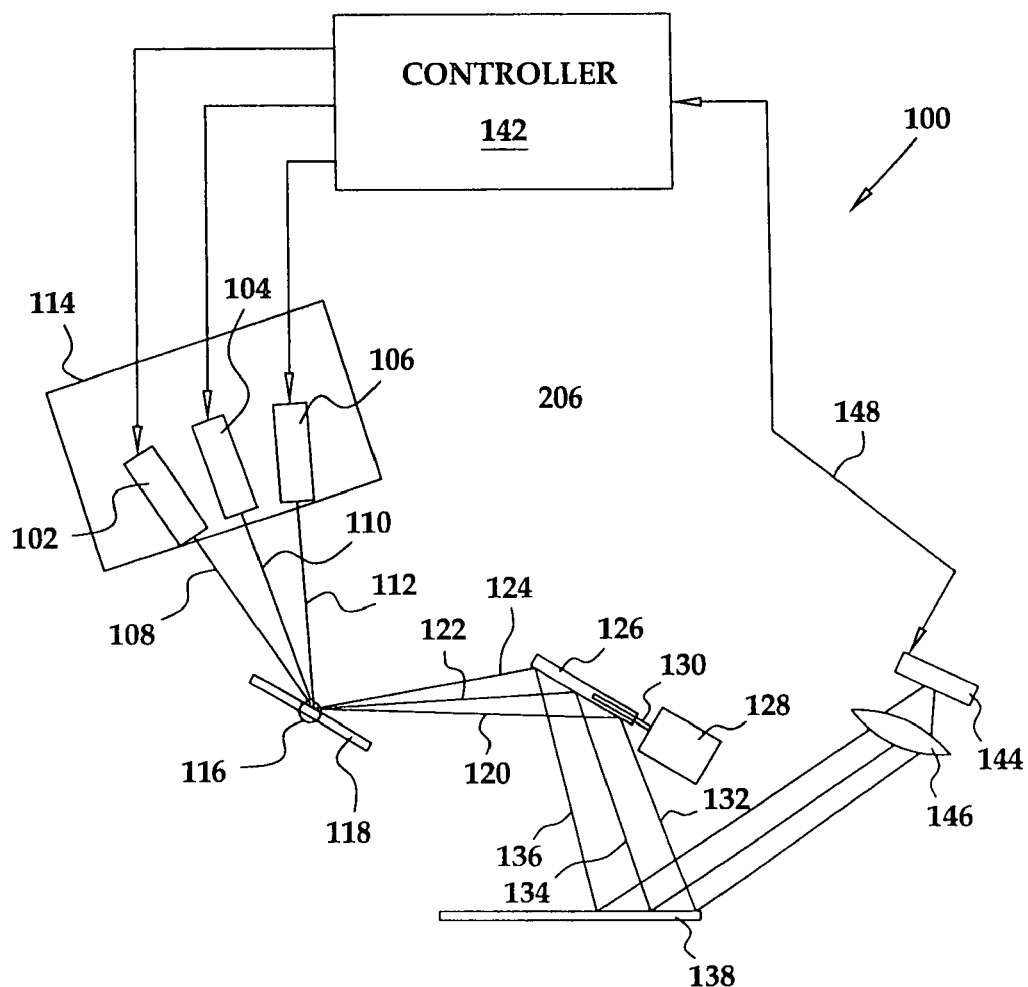
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 116 at a relatively high rate (e.g., about 20-30 KHz). Rotation or oscillation of the first scanning mirror 118 causes the beams of light 108, 110, 112 to be moved. That is, as the angular position of the first scanning mirror 118 alters, so too does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
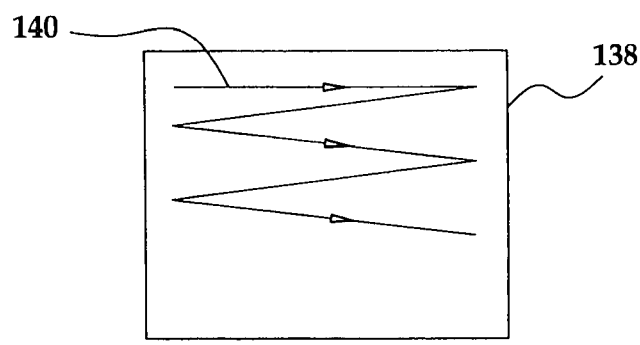
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

Similarly, the controller and the mechanical arrangement of the two scanning mirrors 118 and 126 may be designed to create a raster pattern that is rotated 90-deg from path 140, i.e., instead of horizontal rastering lines that raster from top to bottom of the viewing screen 138, the patterns will consist of vertical rastering lines that raster from left to right of the viewing screen.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3:
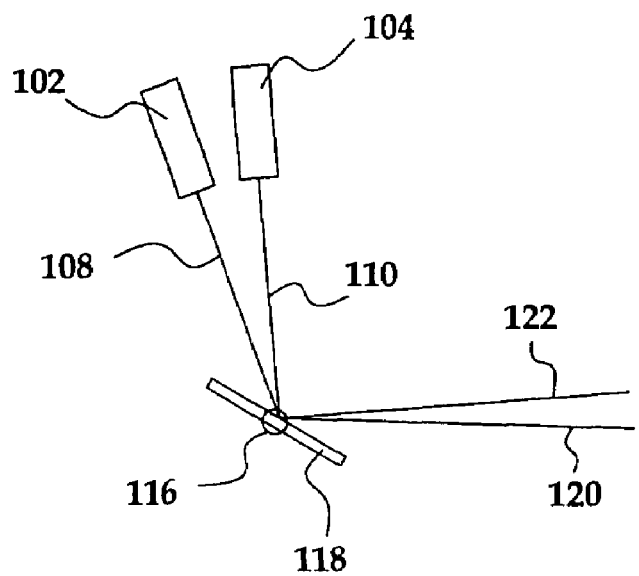
FIGS. 3 and 4 depict a top view of a scanning device at various times during its operation.
Figure 4:
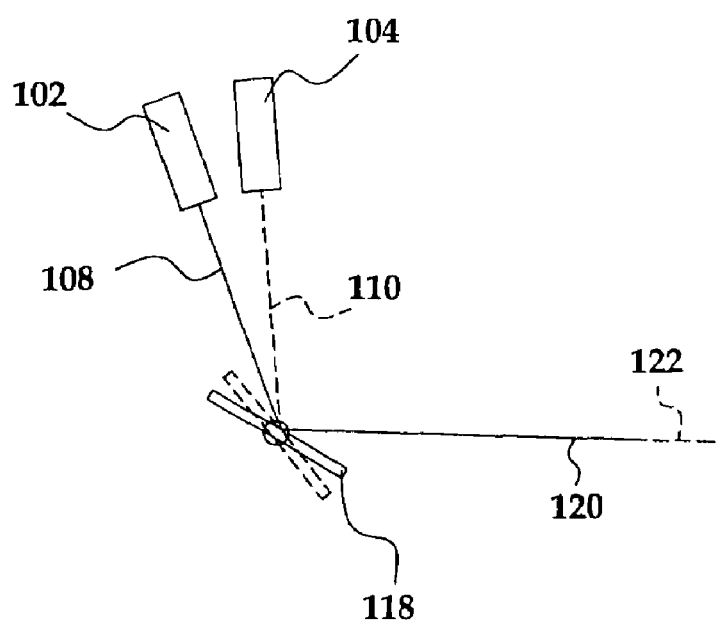

Turning now to FIGS. 3 and 4, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3, if the lasers 102, 104 are energized simultaneously, the reflected beams of light 120, 122 diverge. However, as shown in FIG. 4, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138. It should be appreciated that the LPD 100 may be used in either a display mode or a camera mode. These modes are discussed more fully below.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensors or photosensitive elements, it may be useful to also convey information regarding the location of the reflected laser light. As discussed in more detail below, the controller 142 may use the information regarding the magnitude of the reflected laser light to generally determine the conditions within the transmission path of the lasers, such as by being interrupted by a person or object. The controller 142 may use information regarding such an event to construct a picture or to determine if the viewing surface has been touched. That is, the viewing screen may be rendered "touch sensitive," and thus, may provide a form of feedback from an operator. The information may also be used by the controller to calibrate and fine adjust any frequency drift of the two scanning mirrors so that the image will remain converged.

The controller 142 may display a pushbutton or other accessible icon on the viewing surface, and if the controller 142 detects that the portion of the viewing surface displaying the pushbutton has been touched, then the controller 142 may take a responsive action. For example, the controller 142 may display an icon, and if the controller 142 detects that a user has touched the icon, the controller 142 may perform a function associated with that icon. Similarly, numerous other functions may be implemented by way of appropriately configured or labeled icons displayed on the viewing surface.

Figure 5:
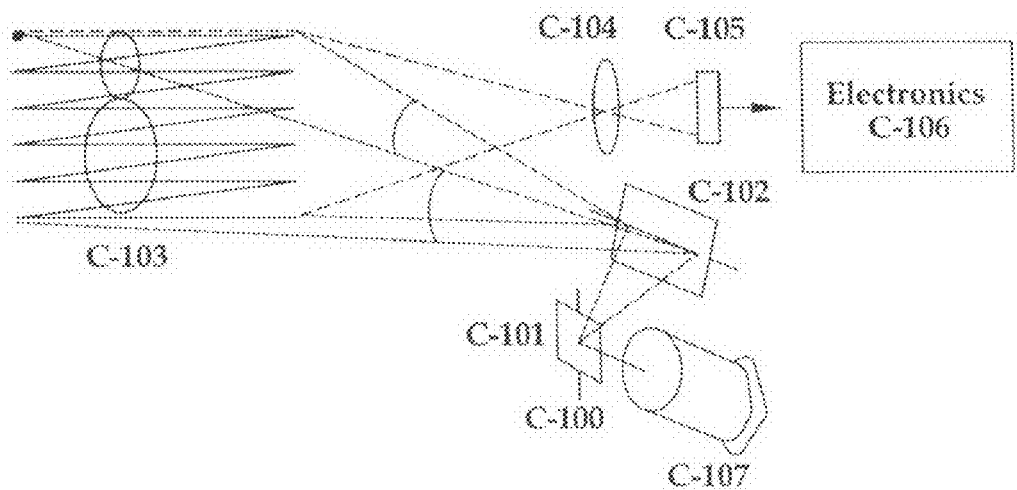
FIGS. 5 through 23 depict various aspects of an image capture device that employs an LPD.

FIG. 5 illustrates the operating principle of a laser camera based on a laser projection display, such as the embodiment described above or in other LPDs configured to scan laser light over an object. A laser is focused by optical means to have a minimum spot (waist) at some distance from the focused laser module C-107. The laser beam C-100 emitted from the focused laser module C-107 is scanned by the scanners C-101 and C-102 in two orthogonal directions to create a raster pattern on an object C-103. There are two basic modes of operation: 1) a display mode; and 2) a camera mode. When the device is in the display mode, the laser is modulated while being scanned to project the display image. In a camera mode, the laser beam is scanned on an object. Laser light intercepted by the object will be scattered, while the scanned laser light that is not intercepted by the object will continue to propagate. A lens C-104 collects the light scattered by the object C-103 and delivers the collected light to the light-sensitive photodiode C-105. The electrical signal generated by the photodiode C-105 is then amplified, sampled, and processed by the signal conditioning and processing electronics C-106. Therefore, instead of capturing the object in a parallel mode at one single time instance as in a conventional camera, a laser camera captures the object in a serial mode, one pixel at a time. Another important distinction is in a traditional camera, the image is "viewed" by the camera lens. In a laser camera, the image is "viewed" by the scanning laser pattern. The above components can be all packaged in one platform to become a laser camera module that can be embedded in a larger system. Note that instead of two scanners, each scanning in one direction, a two-axis scanner that scans two directions can be used, as discussed above. Instead of a signal collecting lens C-104, a signal collecting mirror can be used.

Focusing and Resolution

Figure 6:
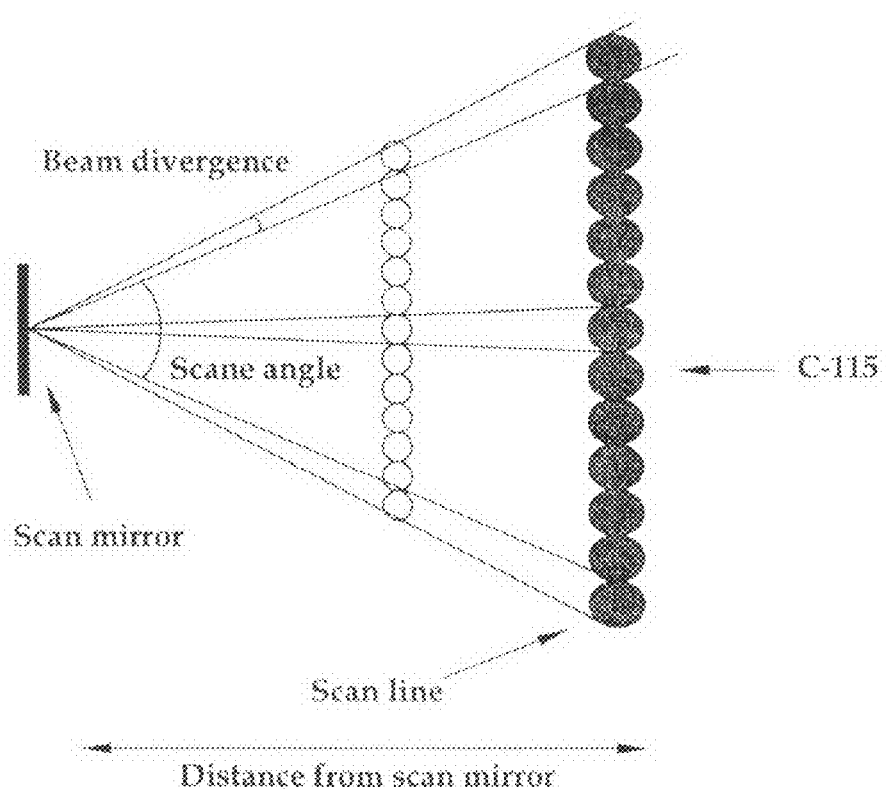

The laser beam is focused such that the beam divergence angle is linearly proportional to the distance. Since the size of the scan raster is also linearly proportional to distance for a given scan angle, it is possible to fit a guaranteed numbers of laser spots C-115 within the scan line at any distance. This is the optical resolution of the camera within any "line". See FIG. 6. Specifically, the optical resolution is:

$$N = \frac{2z\tan(\theta/2)}{w_o\sqrt{1+\left(\frac{4\lambda z}{\pi w_o^2}\right)^2}} \sim \frac{2z\tan(\theta/2)}{\frac{4\lambda z}{\pi w_o}} = \frac{\pi w_o \tan(\theta/2)}{2\lambda} \qquad \text{Eq. 1}$$

where N is the optical resolution, z is the distance from the laser camera, $\theta$ is the scan angle, $w_o$ is the laser beam waist diameter, $\lambda$ is the laser wavelength, and the quantity $4\lambda/\pi w_o$ is the laser beam divergence. In general, the scan mirror area is approximately equal to or larger than $w_o$ so that the beam is not truncated to increase the beam diffraction angle (reduces resolution) and reduce laser power. From the above expression, one sees that the larger the scan angle, or the larger is the size of the scanning surface, the shorter is the wavelength, the higher optical resolution is achievable.

In the above regard, the laser camera can have an "infinite" focusing distance, as long as sufficient energy is collected by the signal collection system. This focusing distance can thus be much longer than the depth of focus of a regular film or CCD/CMOS camera. By adding a focus adjustment mechanism in the device, the laser beam can be re-focused or auto-focused to either further extend the focus range or to achieve a different resolution at any distance from the laser camera.

In a preferred embodiment, one of the scanners oscillates at high speed, and the other one at a lower speed. The oscillating frequency of the low speed scanner should be at least 50 Hz (20 msec or shorter duration) to reduce or prevent flickering of the displayed image. It can oscillate at a lower speed when the device is used as a camera only, not display. The numbers of line (line resolution) of the camera is determined by the ratio of the oscillating frequencies of the two orthogonal scanners. For example, if one scanner oscillates at 20 kHz and the other oscillates at 50 Hz, it is possible to generate 800 back and forth scan lines in the raster. Since laser diodes have fast response, it is possible to pulse the laser diodes at hundreds of megahertz rate to generate an image or capture with VGA (640×480) or higher resolution.

In general, the high-speed scanner is a resonant scanner and its oscillating frequency is fixed. The low speed scanner is usually non-resonant, or driven off-resonance, hence its oscillating frequency can be changed in operation to achieve a different line resolution. For example, if one of the scanners oscillates at 20 kHz and the oscillating frequency of the other scanner is changed to 20 Hz instead of 50 Hz, 2000 lines can be generated. Note that depending on the intended application, it is possible to change the frequency of one or more of the scanners to change the camera resolution or format. Conversely, the low speed scanner can be speeded up so that the capture time can be shortened, if needed, when the object is in motion. For example, if the low speed mirror oscillates at 100 Hz, the laser camera can capture a frame in 10 msec, and the line resolution becomes 400, assuming a 20 kHz high-speed mirror is used.

The optical resolution, the modulation speed of the laser, the oscillating frequencies of the two scanners, and how fast the photodiode is sampled determine the overall resolution of the laser camera.

Signal Strength

The strength of the signal that is captured by the photodiode depends on how much light is scattered back from the object. The more reflective is the object, the higher is the signal strength received. Also, the closer the object to the laser camera, the higher the signal strength, since the collected light is inversely proportional to the square of the distance.

i.e., $$P\_received = \frac{R\_object * P\_transmitted * A\_received}{\pi * z^2} \qquad \text{Eq. 2}$$

where P_received is the received power, R_object is the reflectivity of the object, P_transmitted is the laser power emitted from the laser camera, A_received is the size of the light collection area, and z is the distance from the object to the laser camera.

Note that the photodiode can be used without the lens and still be able to collect the light scattered from the object. A lens that is larger than the photodiode can collect more light, hence it provides more signal. Furthermore, a lens limits the field of view (FOV) of the photodiode, therefore, it reduces the photodiode shot noise due to ambient light. It is possible to pulse the laser at high frequency so that ambient light can be reduced. In general, the photodiode is positioned outside the direct reflection path of the scanned laser beam to avoid saturation.

Zooming/Cropping

Figure 9:
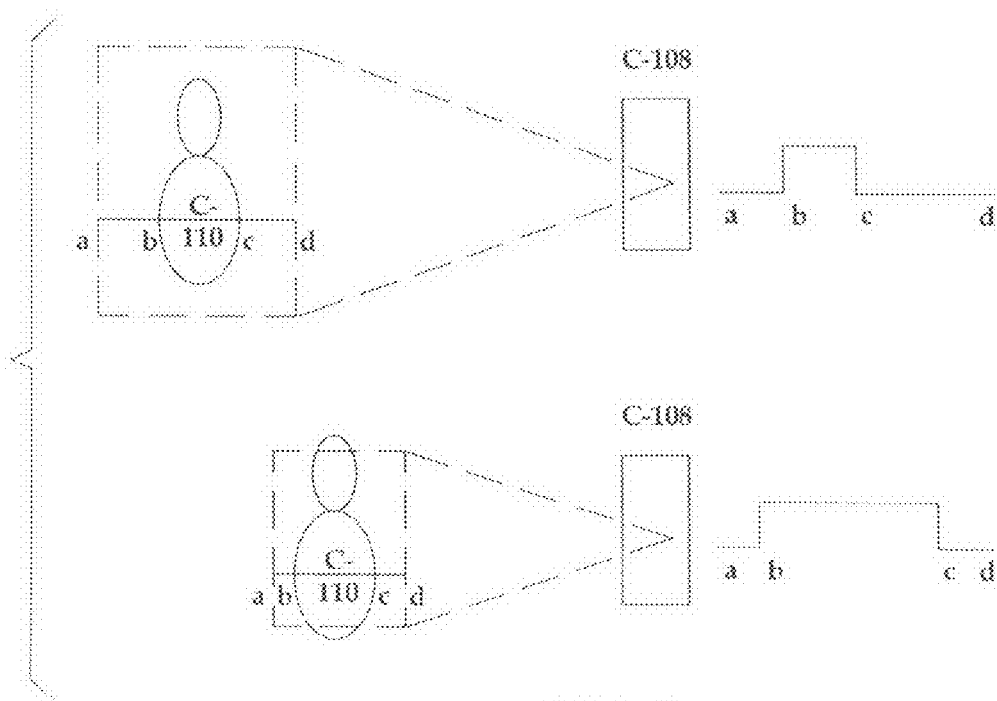

Aside from providing more signal, an object closes to the laser camera occupies a larger portion of the raster pattern, and the spatial frequency of the image generated becomes lower. See FIG. 9. When the object C-110 is far away from the laser camera module C-108, a single laser line crossing the object generates a narrow pulse of duration b-c in the upper figure of FIG. 9. When the object C-110 is closer to the laser module, it takes longer for the same laser line to cross the object to generate a pulse of longer duration (slower frequency). By analyzing the image, it is possible to infer whether the object is close or far away from the laser camera. This information can then be used to control the laser camera setting, so that it has dual or multiple-ranging capabilities. For example, the gain of the electronics can be increased to amplify the received signal from a far-away object, so that the required minimum signal to noise ratio is always guaranteed. Alternatively, the gain is reduced so that the photodiode is not saturated due to a strong signal that is scattered back from the surface.

The information from the captured image, such as signal amplitude and spatial frequency, as well as the amount of a scan line occupied by the image, can be used to provide zooming or wide-angle functions in the laser camera. For example, if the object is far away, a control mechanism can automatically reduce the scan angle so that the object now occupies a larger portion of the scan pattern. This is a zoom equivalent of a regular camera. Conversely, if the object is close by, the scan angle can be increased to a wide-angle mode. It is worthwhile to point out from the resolution expression shown in Eq. 1, the optical resolution is solely dependent on the scan angle, mirror size, and inversely dependent on the laser wavelength. By reducing the scan angle, and even re-adjusting the focused laser spot, the optical resolution will be reduced. In addition to changing the scan angle and/or laser spot size, the oscillating frequency of the scanner, preferably the slow scanner, must also be changed.

Figure 12:
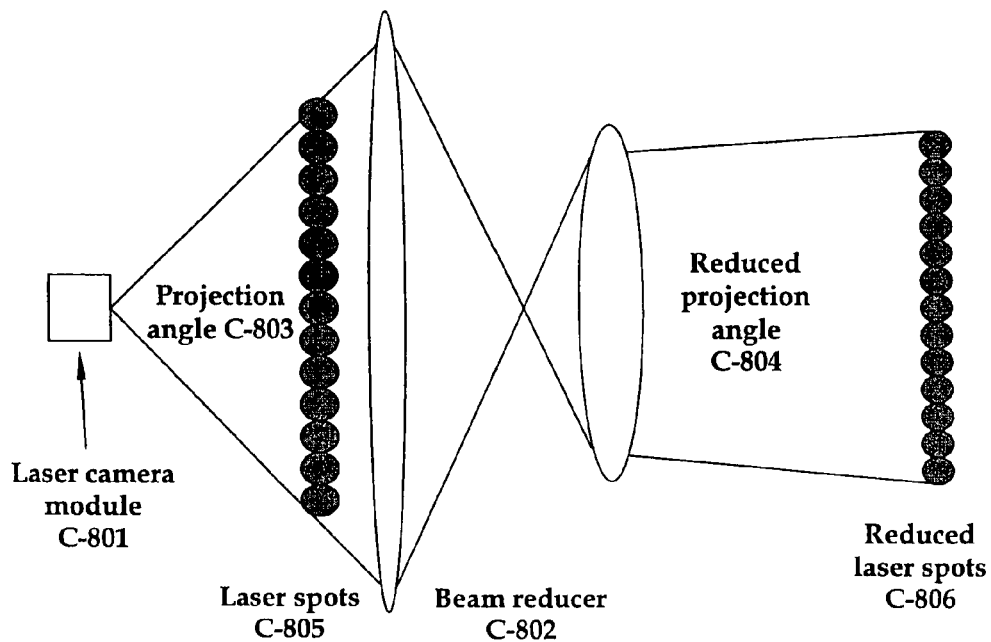
Figure 13:
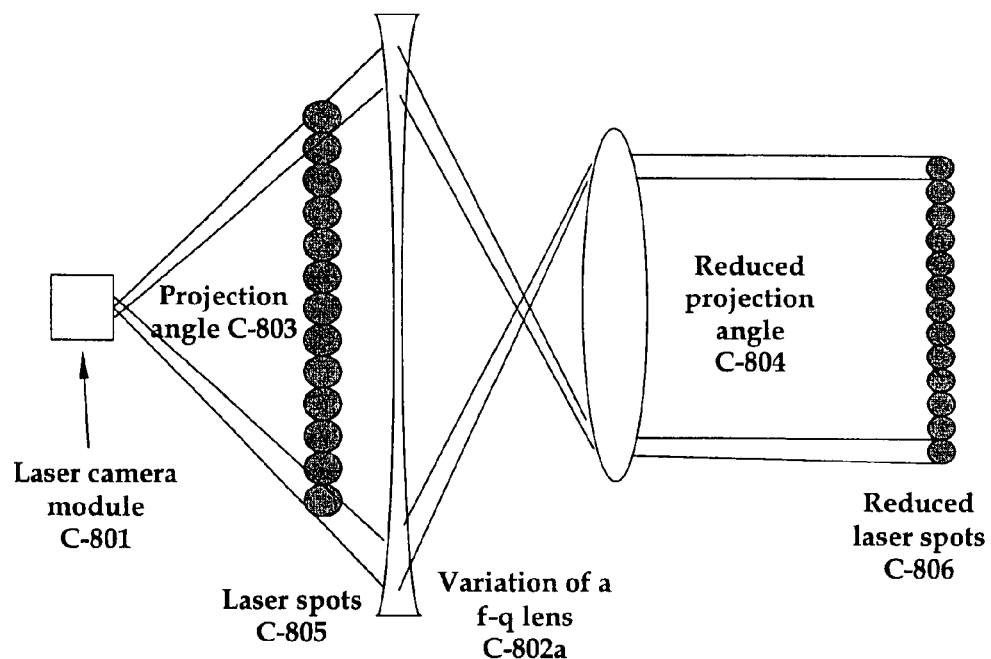
Figure 14:
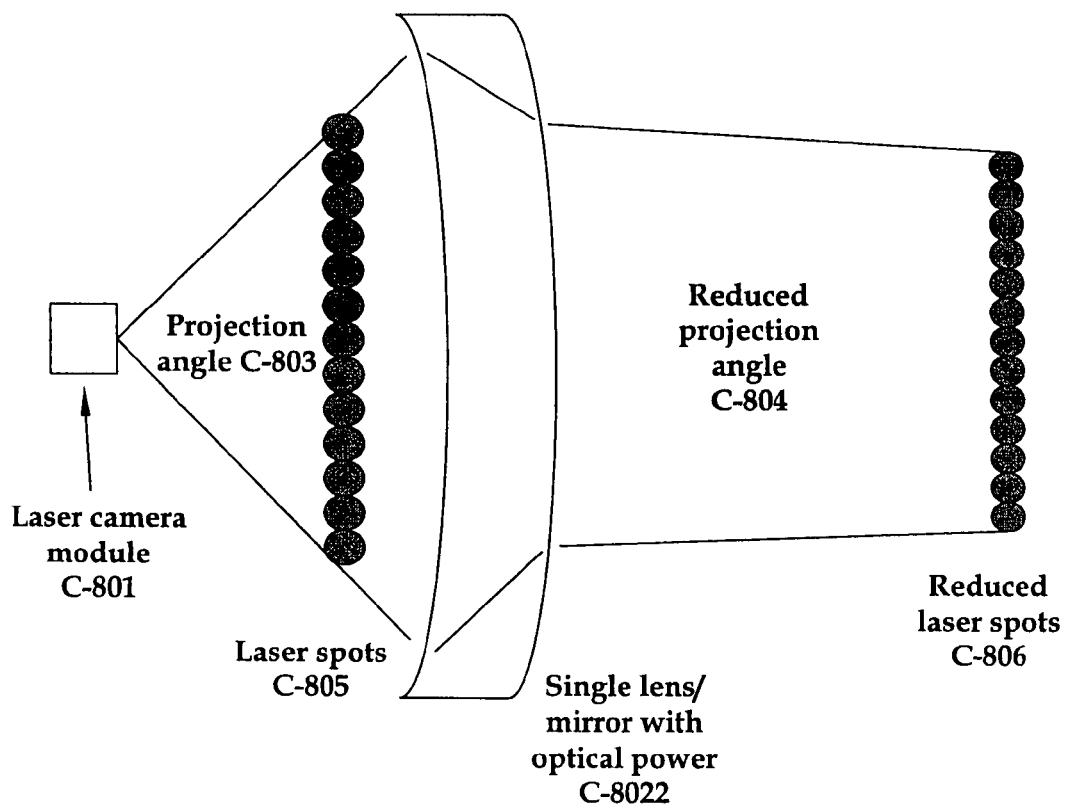

Instead of reducing the scan angle and refocusing, it is possible to place a beam reducer that consists of a lens pair with the proper optical power ratio, in the optical path to reduce the projection angle while changing the laser spot size, without reducing the optical resolution, as shown in FIG. 12. An f-θ lens can also be used, as shown in FIG. 13. Furthermore, the lens pair can be collapsed to become one lens, or one mirror, that has the proper optical power and surface shapes, and placed at a specific location with respect to the scanning mirrors to simultaneously change the projection angle and laser spot size, while maintaining optical resolution. See FIG. 14.

Figure 10:
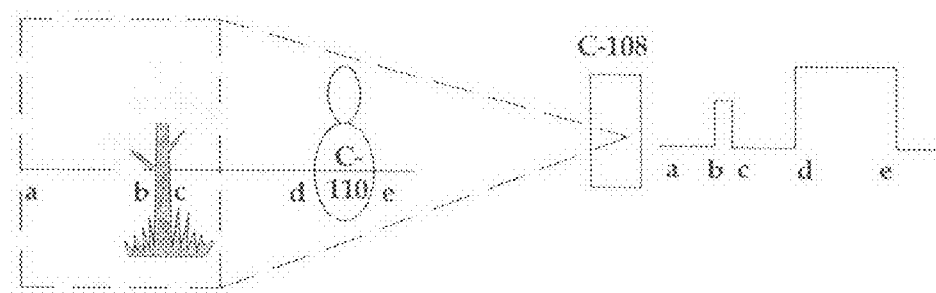

In some instances, it is desirable to crop or highlight the object from the background of the object. This can be easily achieved using the laser camera, since the background signal has different amplitude as shown in FIG. 10, where the tree is farther away than the object and the received signal associated with the tree has lower amplitude. Hence, the tree can be identified, cropped or highlighted.

Color

Figure 11:
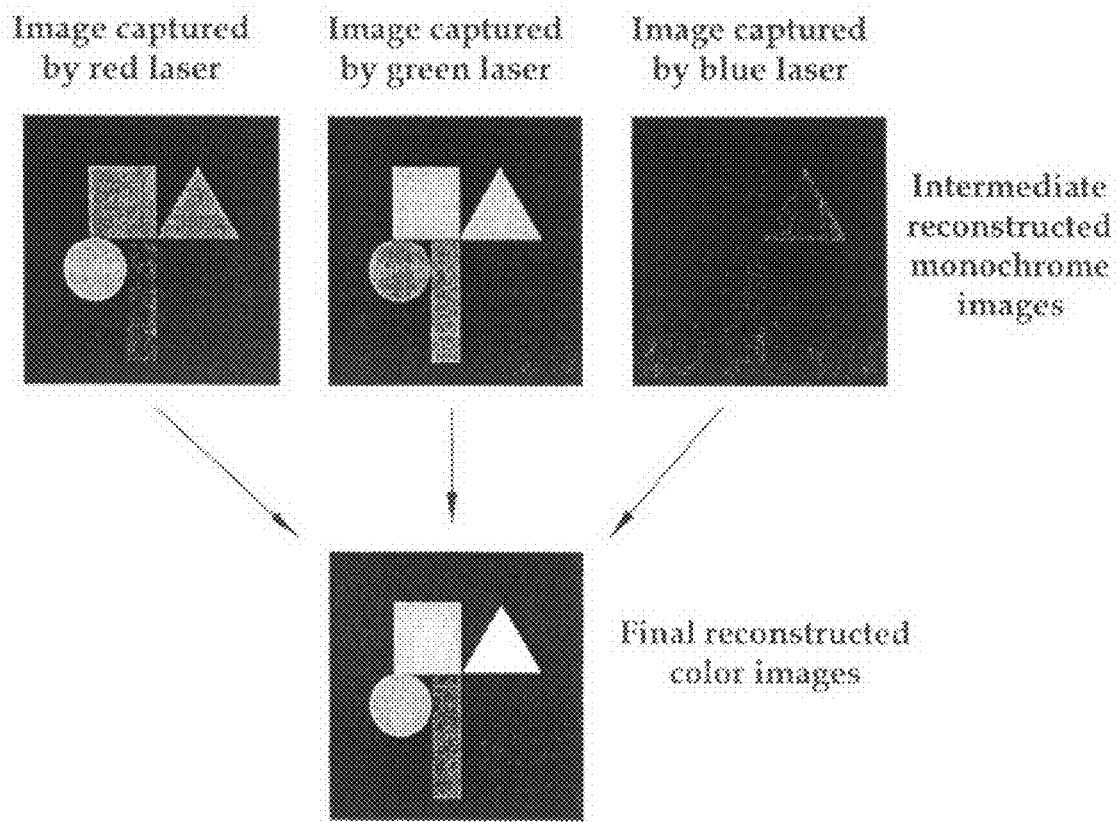

As discussed above, the operation of the laser camera is by scanning a laser beam over the object and a lens/photodiode collects the laser light scattered by the object. The laser light intercepted by the dark area on the object is mostly absorbed, while light area scatters the laser light. Depending on the color on the object, more or less laser light will be scattered. It is worthwhile to point out that the amount of laser light scattered back from a white area and from an area with the same color of the laser beam can be very similar. If there is an area of the image that has the same color as the laser beam adjacent a white area, the two areas might become indistinguishable. This can be exploited to capture and display a color image. By using multiple lasers of different colors, say red, green and blue, and turning the lasers on sequentially, it is possible to infer from the three captured images and reconstruct a color picture. Specifically, when using a red laser to illuminate, the captured image from the red and white areas have high signal amplitude; when a green laser illuminates the same object, green and white areas have high signal amplitude; and so forth for the blue laser. As illustrated in FIG. 11, when an object that consists of areas of different colors is captured by the red laser, the red circle and white triangle of the object scatter a substantial amount of red light, the reconstructed intermediate image shows a red circle and red triangle. Next, the object is scanned by the green laser. This time, the intermediate reconstructed image has a green square and triangle. When a blue laser scans the object, an intermediate image with a blue rectangle and blue triangle is reconstructed. The three upper images in FIG. 11 are the intermediate images captured by a red, green and blue laser, respectively. Analyzing these three intermediate images allows the reconstruction of the original color object, shown in the lower image of FIG. 11.

Another use of a multiple-color laser camera is in industrial barcode reading applications, such as package picking and sorting in warehouses where the speed of barcode reading is critical and the environment is noisy. Traditional barcode readers operate at 30 linear scans/second. An audible beep and/or an LED provide feedback that a read is successful. However, the beep is usually non-audible in a noisy warehouse environment. The LED, which provides a visual feedback, is physically on the barcode reader, which means the operator must take his/her eyes from the barcode target that is at a distance, to look at the LED which is close. It takes seconds for an average person to refocus from the barcode to the LED, then back to the barcode, reducing the throughput of the package picking operation. On the contrary, the laser camera that uses a 20-kHz scanner can operate at 40,000 linear scans/sec. Using a red laser to scan the barcode, and projecting a green laser on the barcode target to indicate a successful scan, the barcode reading operation can be sped up significantly. In another modality of usage, a green laser can project an identification mark on the package for sorting purposes.

Self-Illuminating and No View Finder

Figure 7:
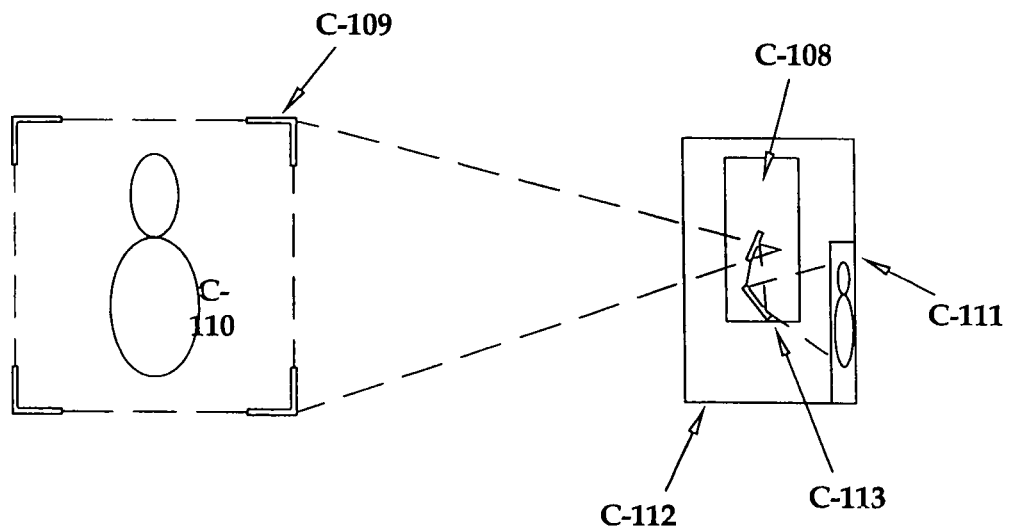

One of the features of the laser camera is the laser beam generated provides self-illumination, and it can take pictures in low ambient light condition or even at night. Since the laser camera module C-108 can project an image, it can therefore project an aiming pattern as well. See FIG. 7. The laser camera projects an aiming pattern C-109 on the object C-110 before a picture of the object is taken, eliminating a separate viewfinder. Furthermore, while capturing the picture, the device can also project what is being captured on a screen C-111 that is part of the laser camera housing C-112. This can be accomplished by inserting a mirror pair C-113, or a prism, that folds the laser beam and projects the image on the screen C-111 on alternating frames. Instead of inserting a mirror and alternating a frame for capture and a frame for display, one can insert a beamsplitter in the scanned laser path so that the captured and projected frames happen simultaneously. Of course, it is possible to project one portion of the raster pattern on the object and another portion of the raster on the screen to project the captured image. The displayed image can be viewed on both sides of a pull-out screen C-114, so that a person whose picture is being taken can also view the picture (self-portrait). The self portrait image can be flipped electronically or optomechanically (e.g., by means of a mirror) so that the person whose picture is being taken, and the person who is taking the picture have the same view and orientation. See FIG. 8.

Figure 8:
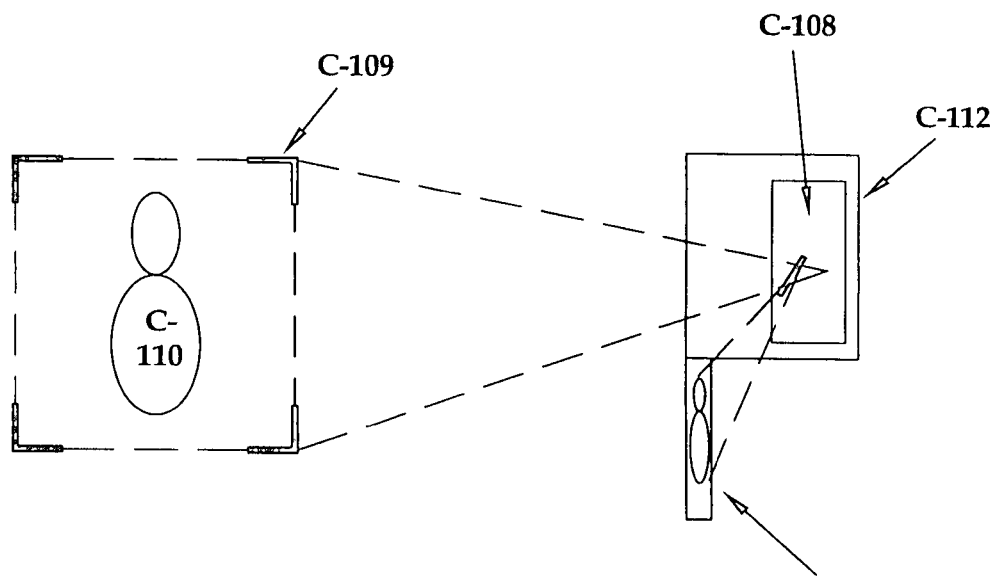

In FIG. 8, the fold mirror is shown to project at a very sharp angle to the pull-out screen C-114. Geometry dictates that the projected image on a screen that is not normal to the direction of projection will exhibit geometric distortion, commonly known as "keystoning" in the projection display industry. For example, a rectangle would become a trapezoid. Since the angle of projection to the screen is known, it is possible to correct for the "keystoning" by pre-distorting the projected image in the pixel image memory in the camera, or by cropping extra displayed pixels/lines.

Instead of a laser emitting a visible beam, an infrared or an ultraviolet laser can be used to take a picture so that picture taking becomes more discrete. Of course, it is possible to capture an image with an infrared laser and project the picture with a laser that emits a visible wavelength. Because of the self-illuminating and long range of the laser camera, it is possible to use an infrared laser in the camera/projector as a light source invisible to human beings with night vision goggles.

Motion and Deskewing

As previously discussed, each frame of the laser projector/camera can be 16 msec (60 Hz frame rate) or shorter. This means the pixel rate is about 30 nano-seconds for a VGA resolution camera/display, and the line rate is about 30 micro-seconds. Each pixel is turned on one at a time in a serial manner. This is not true for a film or CCD-based camera where all pixels are exposed simultaneously during the same exposure time. When the object is in motion, the picture of the object captured by a conventional camera is blurred unless the exposure time is very short, requiring high illumination on the object. In contrast, each pixel of the laser camera is exposed one at a time with 30 nano-seconds pixel exposure time, so there is no blur in the picture. Instead, the picture of the moving object is distorted since each scan line is delayed from the previous line, while the surrounding stationary objects are not. For example, if the object is moving along the high-speed scanning direction at 1 m/sec, each line of the captured image of the object will be delayed from the adjacent line and the resulting image is skewed. The offset between each adjacent line is $$\Delta = \frac{v}{2*fx} = \frac{1}{2*20000} = 0.025 \text{ mm} \qquad \text{Eq. 3}$$

Where v is the speed of motion of the object, and fx is the high speed scanning frequency.

Figure 18:
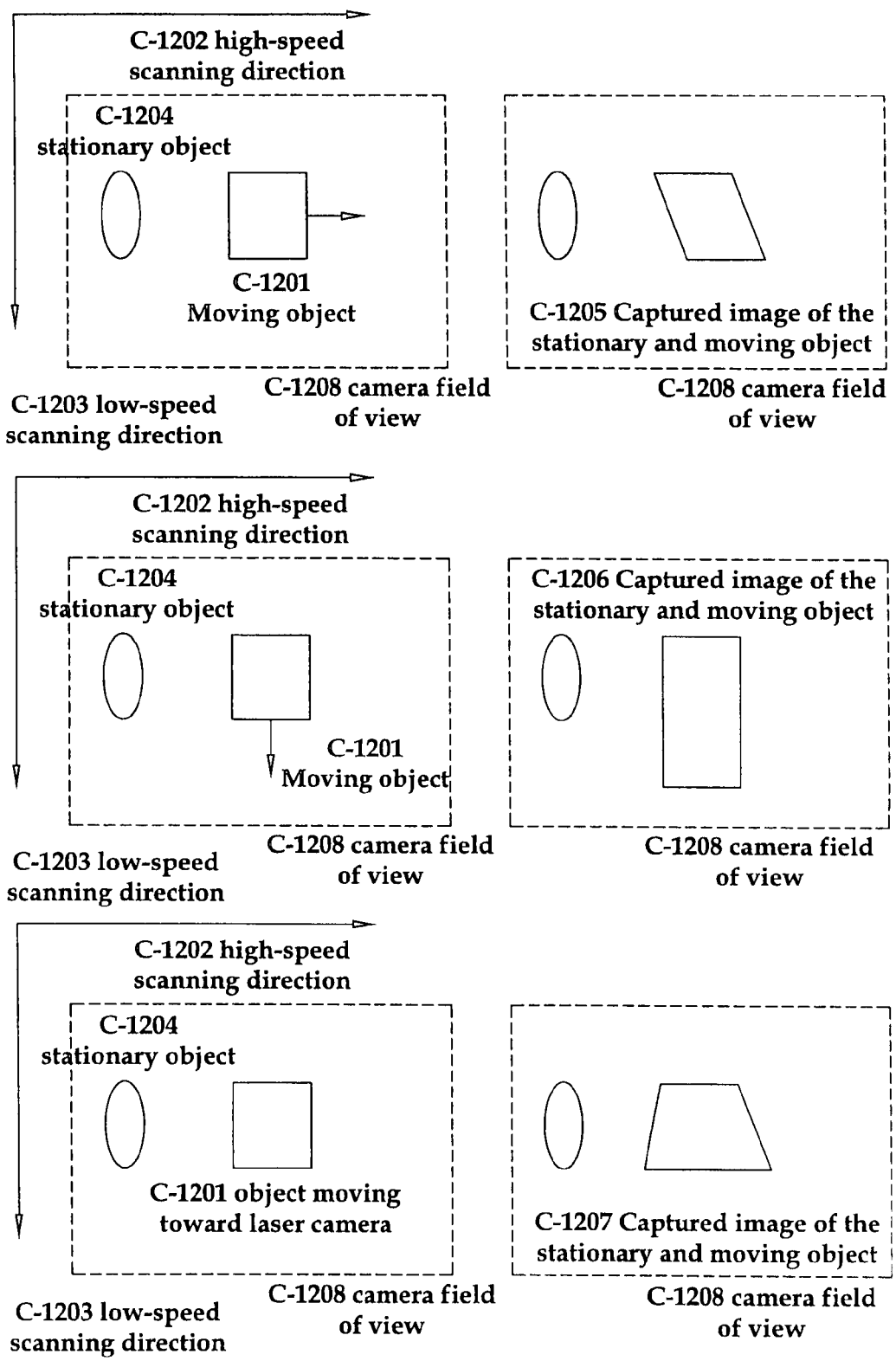

On the other hand, if the object is moving along the low-speed scanning direction, the captured image will be compressed or stretched, also by the same amount per line. And when the object is moving along the line of sight of the laser camera, toward or away from it, the captured image will have a projection angle, i.e., a square object moving toward the laser camera will appear to be an equilateral trapezoid. See FIG. 18.

For general object recognition, the amount of distortion should be acceptable. In barcode applications where the barcodes have inherently recognizable features, such as squares or a bulls-eye, it is possible to restore the distorted captured image to its original form simply from geometry. This can be achieved by re-arranging (bit stuffing or removing) the image data in the memory buffer.

Figure 19:
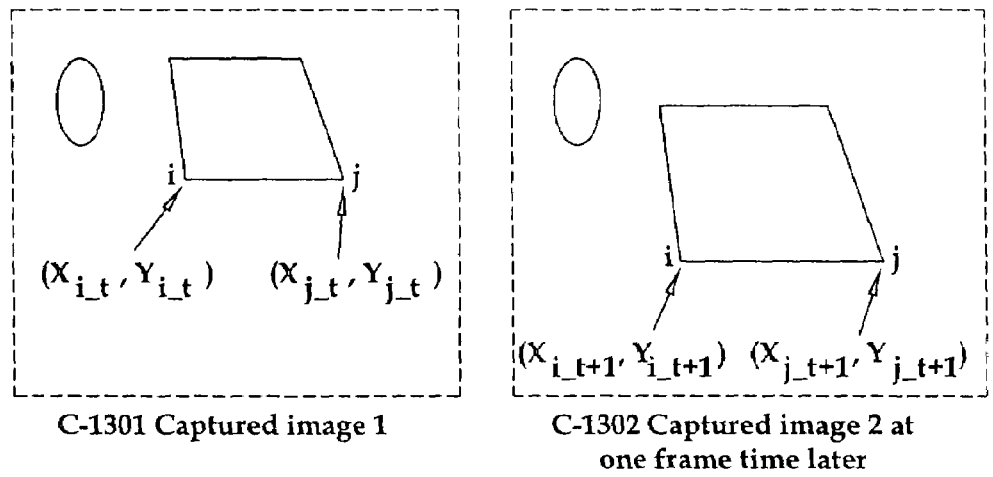

Furthermore, if the speed of the object is known, it is possible to restore the image of any moving object. The motion speed of the object can be derived by analyzing multiple frames of the captured image. Consider the following illustration: an object is moving at 10 ml/sec (roughly the speed of an athlete competing at a 100-meter dash event), and the laser camera is set up to have a 1-meter field of view (30° scan angle and at 2 meters from the object). The object takes 100 msec to cross the laser camera field of view. During this time interval, a laser camera with a 60-Hz frame rate is able to capture 6 frames of the object, each frame showing the object at a different position within its field of view, and any projection distortion due to the object moving toward/away from the camera. Analyzing the differences between the frames and knowing the frame capture time reveal the motion speed and direction. FIG. 19 can be used as an illustration, an object is moving across the field of view of the camera, since the location (in x, y pixel numbers in the memory map) of the object in the captured image, and the time the images are captured, are known, the x-y motion speed and direction can be derived.

$$v_x = \frac{x_{i\_t+1} - x_{i\_t}}{\Delta t} = (x_{i\_t+1} - x_{i\_t}) * f_y \qquad \text{Equ. 4}$$

$$v_y = \frac{y_{i\_t+1} - y_{i\_t}}{\Delta t} = (y_{i\_t+1} - y_{i\_t}) * f_y$$

$$\theta = \tan^{-1}\left(\frac{v_y}{v_x}\right) = \tan^{-1}\left(\frac{y_{i\_t+1} - y_{i\_t}}{x_{i\_t+1} - x_{i\_t}}\right)$$

Where $(x_{i\_t}, y_{i\_t})$ and $(x_{i\_t+1}, y_{i\_t+1})$ are the coordinates of the pixels in the memory map of the images captured at time t and time t+1, associated with a point I on the object, $\Delta t$ is the time interval between subsequent frames captured, $f_y$ is the scan frequency of the low-speed mirror, and $\theta$ tells the direction of the speed of motion.

Likewise, the speed of the object moving along the line of sight of the camera can be calculated by looking at two points I and J on the object across two frames. See FIG. 19.

$$v_z = \frac{L_{t+1} - L_t}{\Delta t} = (L_{t+1} - L_t) * f_y \qquad \text{Equ. 5}$$

Where $L_{t+1}$, and $L_t$ are the lengths from points I to J at time t+1 and time t, respectively.

It should be noted that the above example of using one or two object points to evaluate the captured images only serve as an illustrating example. In general, global evaluation which involves evaluating an ensemble of points/features, of the captured image should be performed.

Printer

The same infrared laser with the same scanners, or alternatively a different set of laser/scanner(s), may be used to print the image on a piece of paper.

Figure 15:
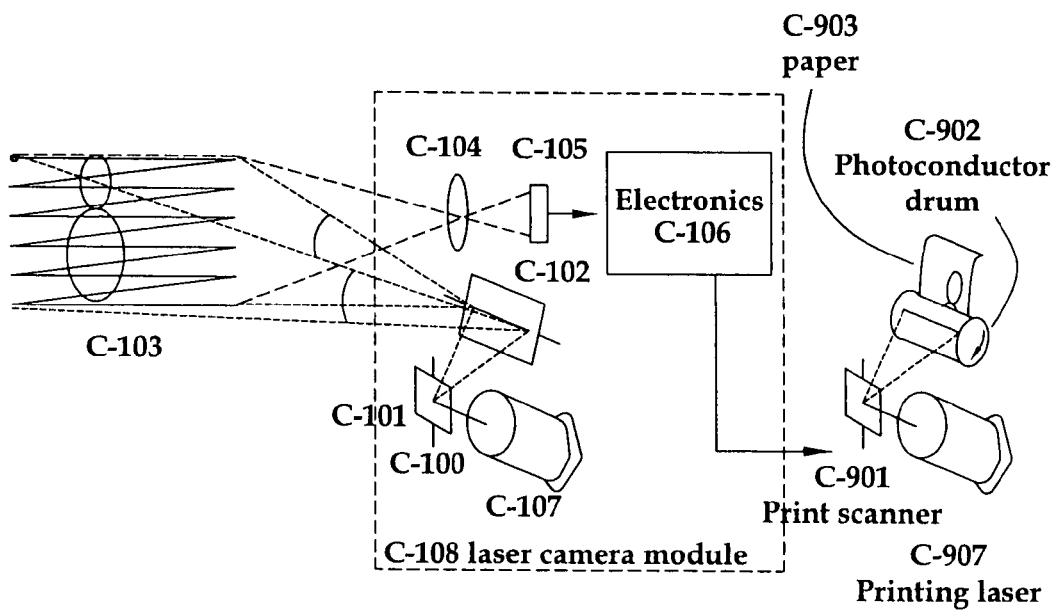
Figure 16:
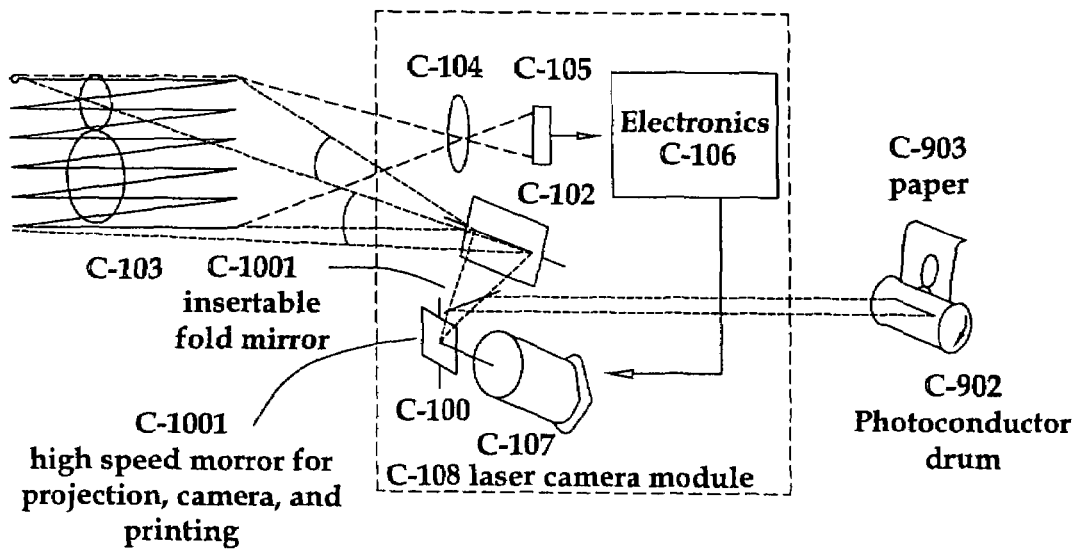
Figure 17:
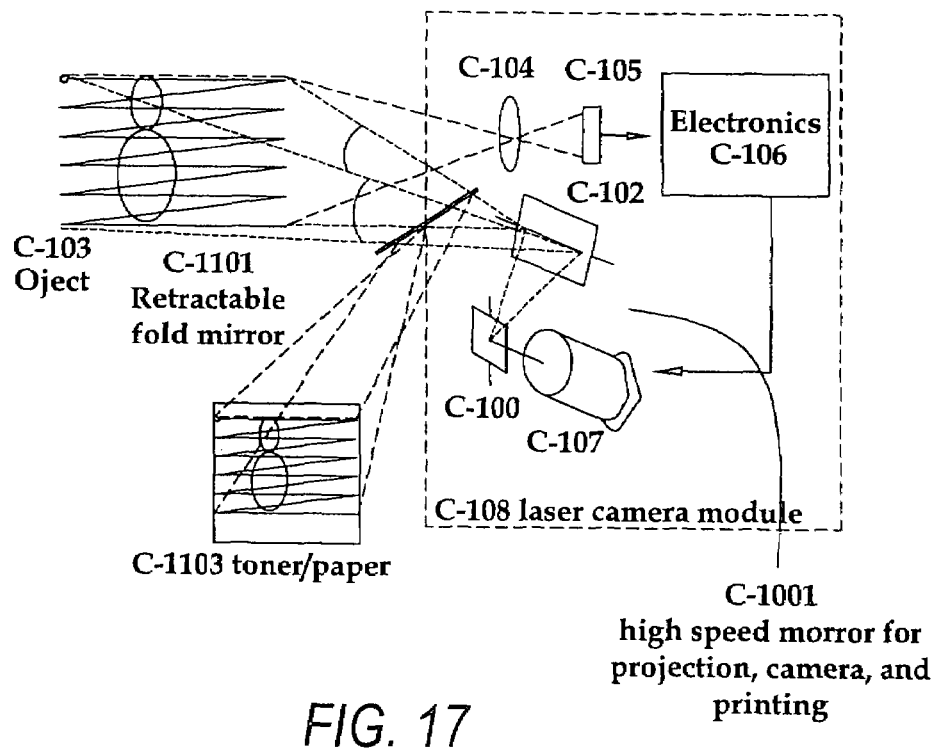

FIG. 15 gives an example of a laser projector/camera with a separate laser that is focused to a spot of about 40 microns (600 dpi resolution) and a one-dimensional high-speed oscillating mirror that creates scan lines across the slow rotating photoconductor drum of a printer. The laser light charges the toner and the drum transfers the toner to the paper. For example, a printer that generates 60 pages per minute at 600 dpi requires a 6.7 kHz scan mirror, and the laser must be modulated at 32 MHz (8"×11" page). Instead of using a separate laser/scanner, a deflection mirror may be used to redirect the laser beam to the photoconducting drum as shown in FIG. 16. The laser will be refocused to generate a 40-micron spot on the toner and modulated at 96 MHz. By re-using the same 20-kHz high-speed mirror, it is possible to print 180 letter-size pages per minute. In practice, the laser must be modulated about 3 to 4 times faster to linearize the non-uniform speed of a sinusoidal high-speed resonant oscillating mirror. Pixel linearization can be accomplished using the dot bunching technique (described more fully below). In many instances, it is not even necessary to print a full letter size page. For example, a VGA resolution laser projector can print a 100 dpi 6"×4" image, and the same laser and scanners used for projection/camera can be reused for printing. In that case, the laser projector simply will be redirected to scan over the surface of a piece of paper through the toner. See FIG. 17.

Range Finding

When there are at least two lasers in the device, the lasers do not need to be perfectly aligned to ease manufacturing alignment requirements. The misalignment can be corrected for in the electronics (as discussed more fully above). Another benefit of not perfectly aligning the two lasers is the potential of increasing the overall output laser power while still meeting required regulations governing lasers. Yet another benefit is to exploit the angular misalignment of the lasers to provide ranging information using triangulation and image analysis of images captured by the two lasers that have parallax.

Figure 20:
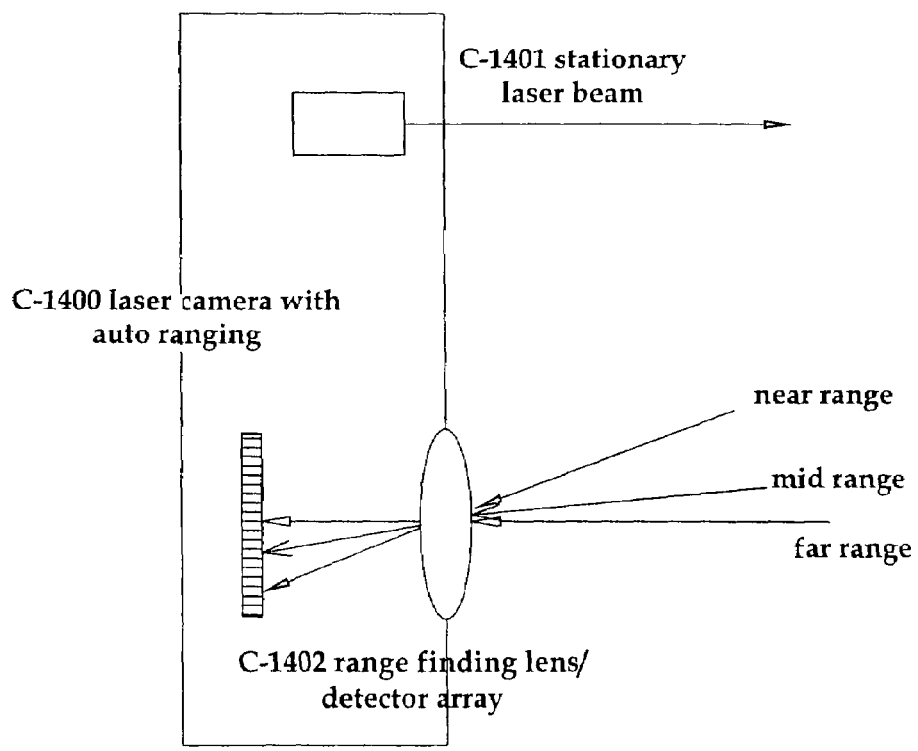
Figure 21:
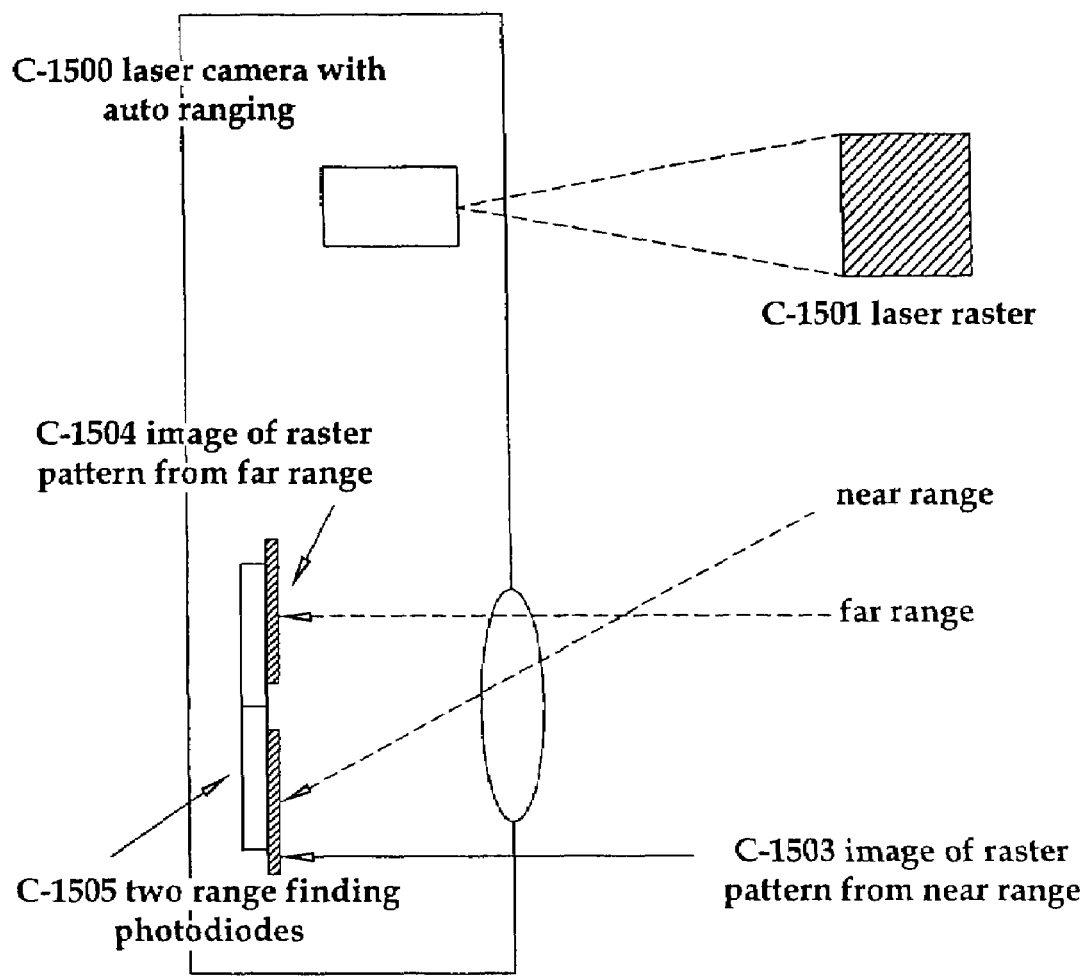

There are several ways to accomplish range finding. By adding a photodiode array, or a linear CCD placed at the focal plane of a lens, while energizing the laser beam before scanning, the range to the target can be calculated based on the arrangement in FIG. 20. This is similar to the range finding arrangement in conventional cameras. Auto-ranging can also be accomplished with a scanning laser raster by looking at the edge of the scanned pattern on the photodiode array, see FIG. 21. When the raster crosses a certain pixel boundary, the range is switched. Note that the numbers of photodiode in the array can be as small as two to have two ranges.

Figure 22:
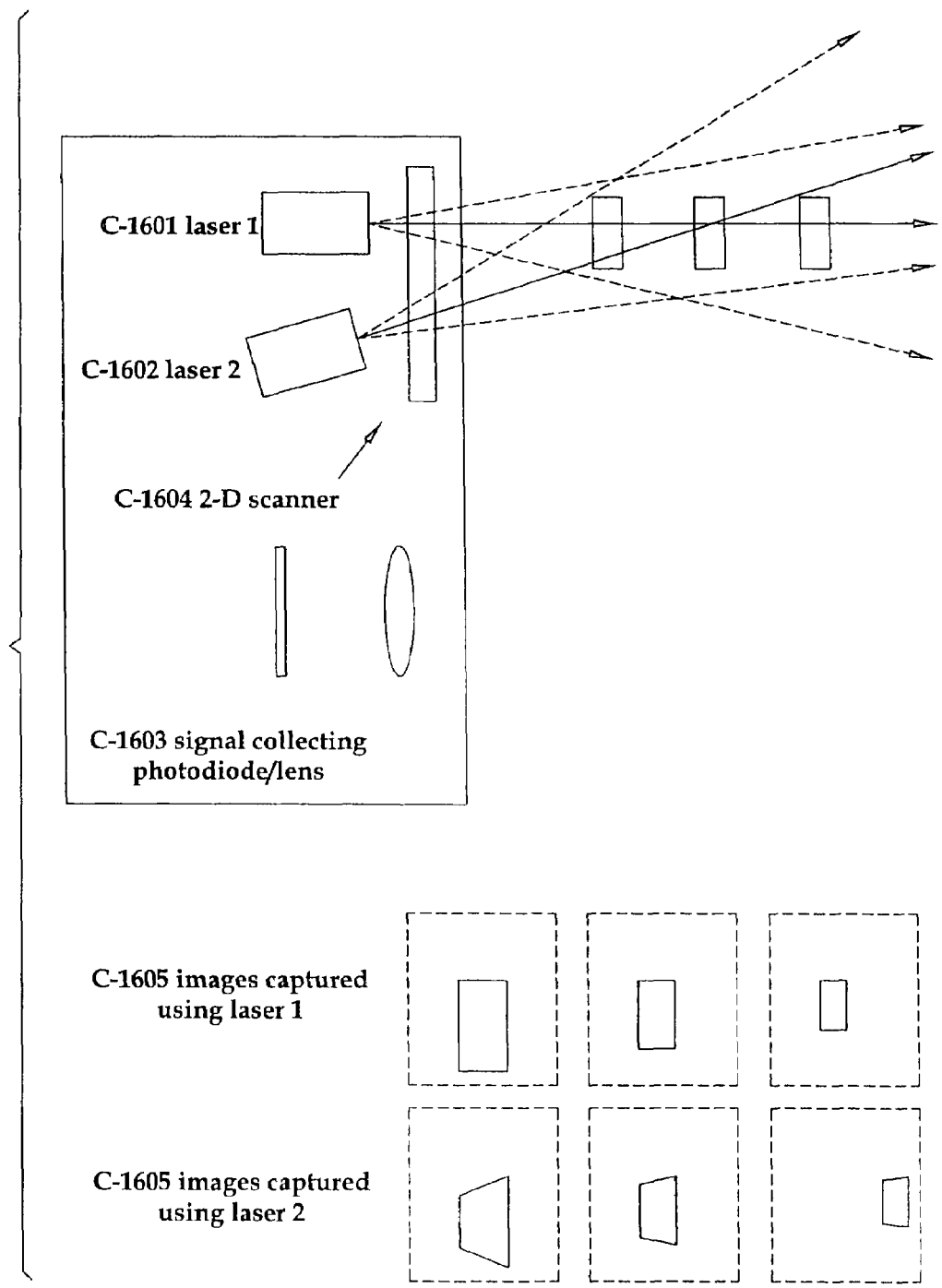

Alternatively, when there are at least two lasers in the laser camera, there is no need for additional range-finding optics/photodiode. Range can be determined by analyzing the relative positions and perspective of an object captured on two images, each by one of the two lasers, as illustrated in FIG. 22. When the object is in the near range, its image as captured by laser 2 is offset from that captured by laser 1. When the object is in the far range, the images are again offset, but this time, in the opposite direction. Geometric distortion/perspective of the captured images by the two lasers can also be exploited to determine the range.

Note that since the depth of focus of a laser camera is fairly long, usually the electronic gain affects the range. Since the frame time of the laser camera can be very fast, it is possible to automatically capture two frames with each triggering of the camera, and use a different electronic gain for each frame. In this brut-force mode, no optical range finding is needed.

Speckle—Autofocus, Motion Detection, CDRH

One of the properties of a laser is that it is spatially coherent. One property of spatial coherence is that an interference pattern appears in the light detector plane (human eyes or photodiode) when the laser light is scattered from any surface. This interference pattern is commonly known as the speckle pattern. The average speckle size (sizes of the dark and bright spots) becomes larger as the object is farther from the laser. One can infer from the average speckle size the approximate range of the target from the laser. Also, if multiple lasers are used, the amplitude of the speckle becomes smaller by the geometric mean of the numbers of lasers hitting the same location on the target. By purposely misaligning the three lasers in a laser camera, it is possible to achieve autofocusing by analyzing the speckle amplitude. When the three lasers arrive at the same spot at a focused plane, it is where the laser speckle amplitude will be the lowest at that distance.

Since the speckle pattern changes depending on the object, a laser camera can be used to detect motion. For example, in a barcode scanning application, it is possible to have a laser projection display that is normally displaying an image on a screen. When a barcode interrupts the scanning laser beam to cause a change in the speckle pattern, the display is automatically switched to a camera mode to capture the barcode. In another example, the laser display is projecting to a screen in a rear projection mode, when the screen is broken, the speckle pattern changes and the laser is turned off. Therefore, the laser beam does not accidentally flash across the eye of a person. The same is true if the laser is projecting an image to a screen in a free-projection mode, when an object interrupts the laser beam, the speckle pattern changes and the laser is turned off.

3-D

Figure 23:
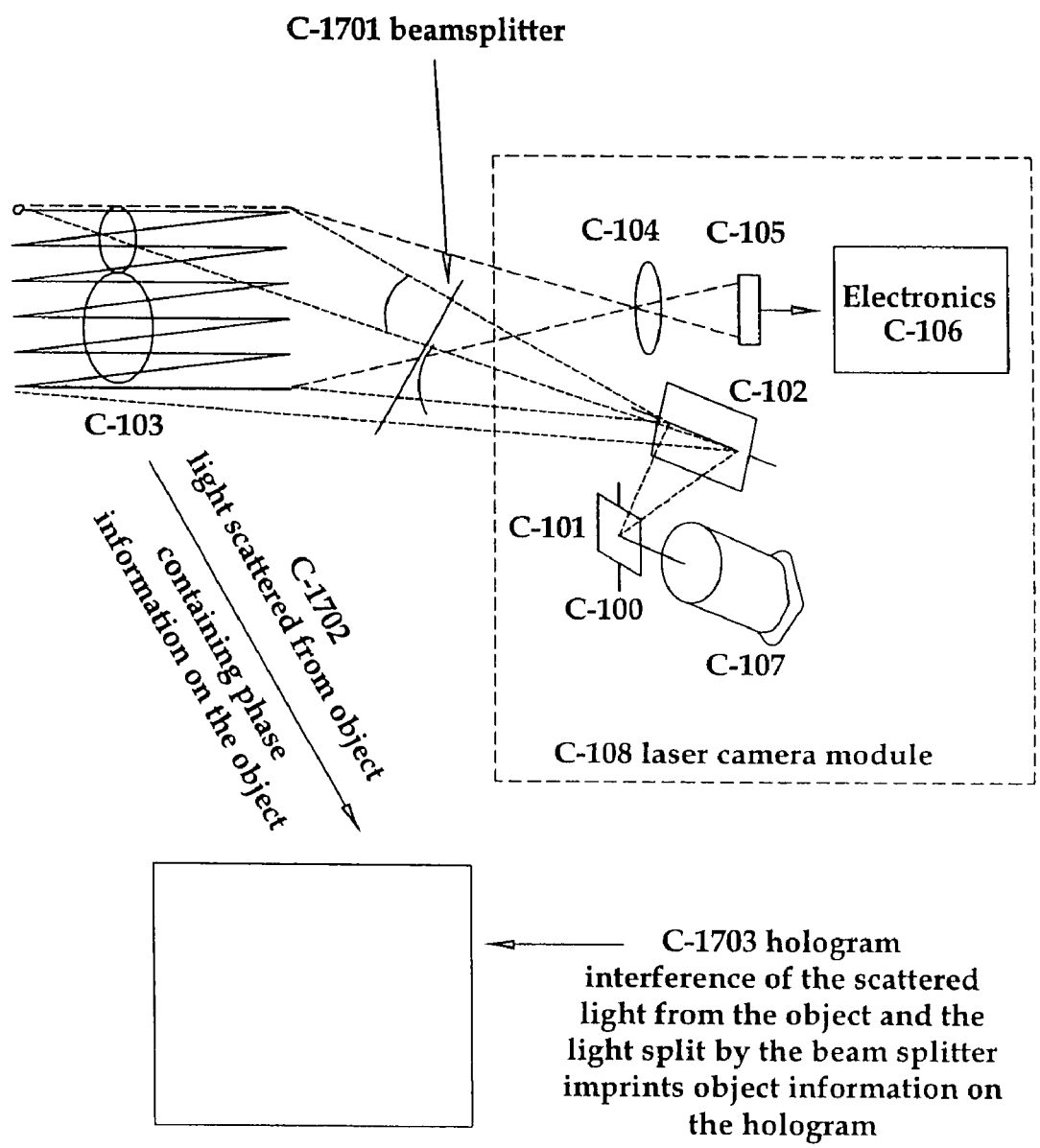

Since the speckle pattern is a result of interference of the laser light scattered from an object, it is possible to store and reconstruct a 3-D image of the object, similar to holography. See FIG. 23.

Using three lasers, each at a different angle of incident to the object, and a single or multiple photodiodes, each laser will capture the object at a different angle/perspective. It is then possible to construct a 3-D image of the object.

CCD/Laser Cam

3-D functionality can also be accomplished by using a laser camera in conjunction with a CCD- or CMOS based camera that is not coplanar with the laser.

Since a laser camera functions best in a dimly-lit environment and a CCD camera functions best in high ambient light environment, a combined camera consisting of a laser camera and a CCD camera brings out the best of each camera. One can also mix the resolution of the two cameras. For example, one embodiment of such a mixed mode camera may use the laser camera to have large resolution and a small format CCD with low resolution.

Others

The display is power on-demand. It is enabled only when a switch is depressed, and disabled when the switch is released, hence conserving battery life in a handheld terminal. A photodiode is included in the portion of the product that masks the top and bottom lines of the display. This photodiode receives the laser light during a frame. The received signal can be used to synchronize the phase of the pixel clock and the scanner.

Voice can be used as the input mechanism for the device. Track-ball or small buttons can be used as the input mechanism.

"Touch screen" input can be implemented. The laser projection display projects "icons" on a screen. The product has a photodiode that captures the scattered laser light during a frame, and the processor remembers where the icons are in the frame. A user can touch a particular icon on the screen with his/her finger. The photodiode and electronics in the terminal senses the change in the reflected light in that area and knows that particular "icon" was selected. Hence, the laser display is inherently a "touchscreen."

Accelerometers can be integrated in a pen terminal. The accelerometers sense the motion of the pen as the user writes. The accelerometers also sense hand-jitter and correct the hand-jitter. By sensing the movement of the hand, the signal from the accelerometer can be used to dynamically changes the size of the display or to zoom-in in a particular area of the display. For example, moving the pen terminal closer to the projection screen will enable a zoom-in display.

The accelerometer can also sense the movement of the hand and pan the display, hence it can be used as a scroll bar.

For example, moving the pen terminal sideways will pan the display left and right, and moving the pen up and down will scroll the display up and down. Of course, the display can be scrolled or panned by voice, track ball or "touchscreen" input.

The laser light during a horizontal scan can be pulsed to sample the image to be captured (to reduce noise, to circumvent a big dc-signal).

The laser projection display can be used in a wearable device. The laser scanner can be mounted on the side of the head of the user, and projects the image on a screen mounted near the eye of the user.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An image capture and projection arrangement, comprising:
    a) a laser source for generating a laser beam;
    b) a scanner for sweeping the laser beam to form a scan line having a number of pixels arranged along a first direction, and for sweeping the scan line along a second direction generally orthogonal to the first direction to form a raster pattern of scan lines;
    c) a detector for receiving light from the scan lines scattered off a target; and
    d) a controller for controlling the laser source to illuminate selected pixels on the scan lines to project an image on a projection surface during a display mode of operation, and for controlling the detector to receive the light from the scan lines scattered off the target, each pixel of the scan lines being serially received in its turn, to capture an image of the target during a camera mode of operation, the controller being operative for detecting the number of pixels in at least one of the scan lines occupied by the target in the camera mode, and for changing a size of the target image in response to the detection.

2. An image capture and projection arrangement, comprising:
    a) a laser source for generating a laser beam;
    b) a scanner for sweeping the laser beam to form a scan line having a number of pixels arranged along a first direction, and for sweeping the scan line along a second direction generally orthogonal to the first direction to form a raster pattern of scan lines;
    c) a detector for receiving light from the scan lines scattered off a target; and
    d) a controller for controlling the laser source to illuminate selected pixels on the scan lines to project an image on a projection surface during a display mode of operation, and for controlling the detector to receive the light from the scan lines scattered off the target, each pixel of the scan lines being serially received in its turn, to capture an image of the target during a camera mode of operation, the controller being operative for detecting the number of pixels in at least one of the scan lines occupied by the target in the camera mode, and for determining a range of the target relative to the scanner.

3. An image capture and projection arrangement, comprising:
    a) a laser source for generating a laser beam;
    b) a scanner for sweeping the laser beam to form a scan line having a number of pixels arranged along a first direction, and for sweeping the scan line along a second direction generally orthogonal to the first direction to form a raster pattern of scan lines;
    c) a detector for receiving light from the scan lines scattered off a target; and
    d) a controller for controlling the laser source to illuminate selected pixels on the scan lines to project an image on a projection surface during a display mode of operation, and for controlling the detector to receive the light from the scan lines scattered off the target, each pixel of the scan lines being serially received in its turn, to capture an image of the target during a camera mode of operation, the controller being operative for capturing successive images of the target in the camera mode, and for determining a range of the target relative to the scanner.

4. An image capture and projection arrangement, comprising:
    a) a laser source for generating a laser beam;
    b) a scanner for sweeping the laser beam to form a scan line having a number of pixels arranged along a first direction, and for sweeping the scan line along a second direction generally orthogonal to the first direction to form a raster pattern of scan lines;

c) a detector for receiving light from the scan lines scattered off a target; and d) a controller for controlling the laser source to illuminate selected pixels on the scan lines to project an image on a projection surface during a display mode of operation, and for controlling the detector to receive the light from the scan lines scattered off the target, each pixel of the scan lines being serially received in its turn, to capture an image of the target during a camera mode of operation, the controller being operative for capturing successive images of the target in the camera mode, and for determining a rate of movement of the target relative to the scanner.

5. An image capture and projection arrangement, comprising:

a) a laser source for generating a laser beam, the laser source including a plurality of lasers;

b) a scanner for sweeping the laser beam to form a scan line having a number of pixels arranged along a first direction, and for sweeping the scan line along a second direction generally orthogonal to the first direction to form a raster pattern of scan lines;

c) a detector for receiving light from the scan lines scattered off a code; and d) a controller for controlling the laser source to illuminate selected pixels on the scan lines to project an image on a projection surface during a display mode of operation, and for controlling the detector to receive the light from the scan lines scattered off the code, each pixel of the scan lines being serially received in its turn, to capture an image of the code during a camera mode of operation, the controller being operative for energizing one of the lasers to capture the image of the code during the camera mode, and for energizing another of the lasers to display an acknowledgment mark on the code after the code has been successfully read during the display mode.

6. An image capture and projection method, comprising the steps of:

a) generating a laser beam;

b) sweeping the laser beam to form a scan line having a number of pixels arranged along a first direction, and sweeping the scan line along a second direction generally orthogonal to the first direction to form a raster pattern of scan lines;

c) receiving light from the scan lines scattered off a target;

d) illuminating selected pixels on the scan lines to project an image on a projection surface during a display mode of operation, and receiving the light from the scan lines scattered off the target, each pixel of the scan lines being serially received in its turn, to capture an image of the target during a camera mode of operation; and e) detecting the number of pixels in at least one of the scan lines occupied by the target in the camera mode, and changing a size of the target image in response to the detection.

7. An image capture and projection method, comprising the steps of:

a) generating a laser beam;

b) sweeping the laser beam to form a scan line having a number of pixels arranged along a first direction, and sweeping the scan line along a second direction generally orthogonal to the first direction to form a raster pattern of scan lines;

c) receiving light from the scan lines scattered off a target;

d) illuminating selected pixels on the scan lines to project an image on a projection surface during a display mode of operation, and receiving the light from the scan lines scattered off the target, each pixel of the scan lines being serially received in its turn, to capture an image of the target during a camera mode of operation; and e) detecting the number of pixels in at least one of the scan lines occupied by the target in the camera mode, and determining a range of the target.

8. An image capture and projection method, comprising the steps of:

a) generating a laser beam;

b) sweeping the laser beam to form a scan line having a number of pixels arranged along a first direction, and sweeping the scan line along a second direction generally orthogonal to the first direction to form a raster pattern of scan lines;

c) receiving light from the scan lines scattered off a target;

d) illuminating selected pixels on the scan lines to project an image on a projection surface during a display mode of operation, and receiving the light from the scan lines scattered off the target, each pixel of the scan lines being serially received in its turn, to capture an image of the target during a camera mode of operation; and e) capturing successive images of the target in the camera mode, and determining a range of the target.

9. An image capture and projection method, comprising the steps of:

a) generating a laser beam;

b) sweeping the laser beam to form a scan line having a number of pixels arranged along a first direction, and sweeping the scan line along a second direction generally orthogonal to the first direction to form a raster pattern of scan lines;

c) receiving light from the scan lines scattered off a target;

d) illuminating selected pixels on the scan lines to project an image on a projection surface during a display mode of operation, and receiving the light from the scan lines scattered off the target, each pixel of the scan lines being serially received in its turn, to capture an image of the target during a camera mode of operation; and e) capturing successive images of the target in the camera mode, and determining a rate of movement of the target.

10. An image capture and projection method, comprising the steps of:

a) generating a laser beam;

b) sweeping the laser beam to form a scan line having a number of pixels arranged along a first direction, and sweeping the scan line along a second direction generally orthogonal to the first direction to form a raster pattern of scan lines;

c) receiving light from the scan lines scattered off a code;

d) illuminating selected pixels on the scan lines to project an image on a projection surface during a display mode of operation, and receiving the light from the scan lines scattered off the code, each pixel of the scan lines being serially received in its turn, to capture an image of the code during a camera mode of operation; and e) energizing one laser to capture the image of the code during the camera mode, and energizing another laser to display an acknowledgment mark on the code after the code has been successfully read during the display mode.

* * * * *